(12) United States Patent
Watanabe

(10) Patent No.: US 11,516,319 B2
(45) Date of Patent: Nov. 29, 2022

(54) COMMUNICATION SYSTEM, MEMORY DEVICE, AND COMMUNICATION METHOD

(71) Applicant: KIOXIA CORPORATION, Tokyo (JP)

(72) Inventor: Manabu Watanabe, Kawasaki Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 17/009,576

(22) Filed: Sep. 1, 2020

(65) Prior Publication Data

US 2021/0297511 A1 Sep. 23, 2021

(30) Foreign Application Priority Data

Mar. 23, 2020 (JP) .............................. JP2020-050472

(51) Int. Cl.
*H04L 29/06* (2006.01)
*H04L 69/22* (2022.01)
*H04L 45/74* (2022.01)
*H04L 69/16* (2022.01)

(52) U.S. Cl.
CPC .............. *H04L 69/22* (2013.01); *H04L 45/74* (2013.01); *H04L 69/16* (2013.01)

(58) Field of Classification Search
CPC .... G06F 13/00; G06F 9/4405; G06F 13/1694; G11C 7/1072; G11C 7/1006; G02B 6/428; H04L 45/74; H04L 69/22
See application file for complete search history.

(56) References Cited

U.S. PATENT DOCUMENTS

| | | | |
|---|---|---|---|
| 7,042,845 B1 * | 5/2006 | Naumann | ............... H04L 12/56 370/235 |
| 9,141,398 B2 | 9/2015 | Fujimoto | |
| 9,146,866 B2 | 9/2015 | Fujimoto | |
| 2014/0281325 A1 * | 9/2014 | Meaney | .............. G06F 11/1604 711/167 |

FOREIGN PATENT DOCUMENTS

JP 2009239656 A 10/2009

\* cited by examiner

*Primary Examiner* — Mansour Oveissi
(74) *Attorney, Agent, or Firm* — Kim & Stewart LLP

(57) ABSTRACT

According to one embodiment, a communication system includes a controller and a plurality of devices serially connected to the controller by a communication path. Each device has a different identifying address from each other device. The communication path connects the controller to the plurality of devices in a loop. The communication path is configured to transmit a communication frame as a differential serial signal. The communication frame includes a plurality of packets. Each packet in the plurality of packets has a fixed data length. Each device is configured to insert data into, and extract data from, a packet in the communication frame.

20 Claims, 11 Drawing Sheets

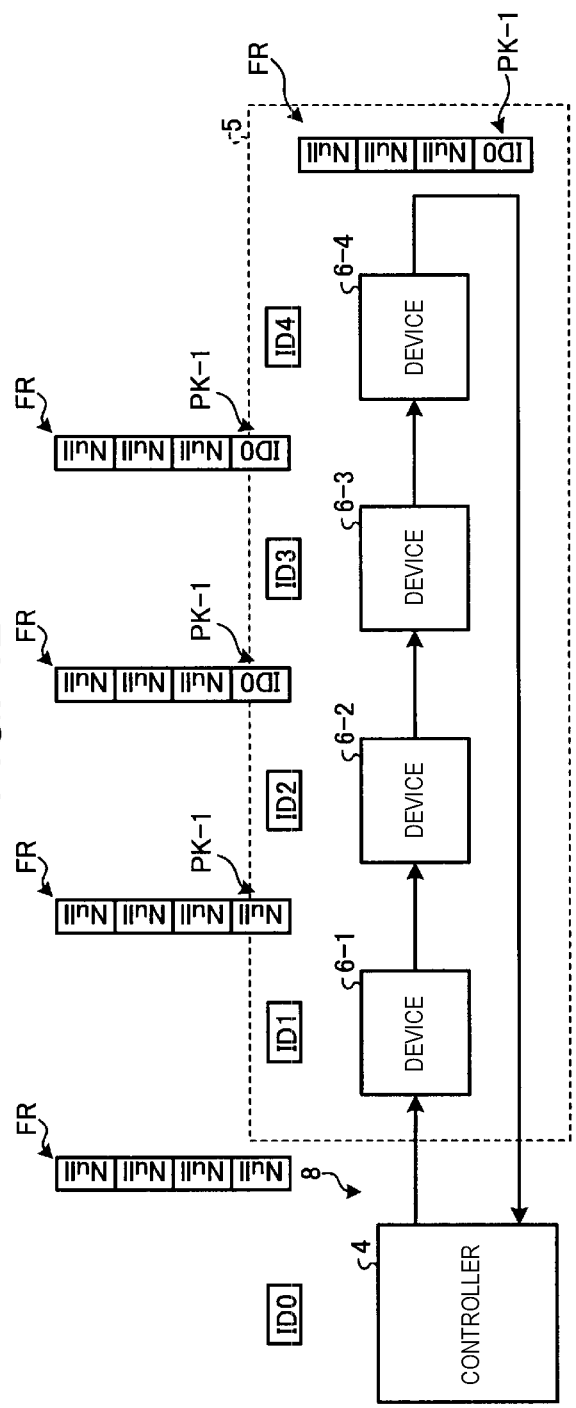

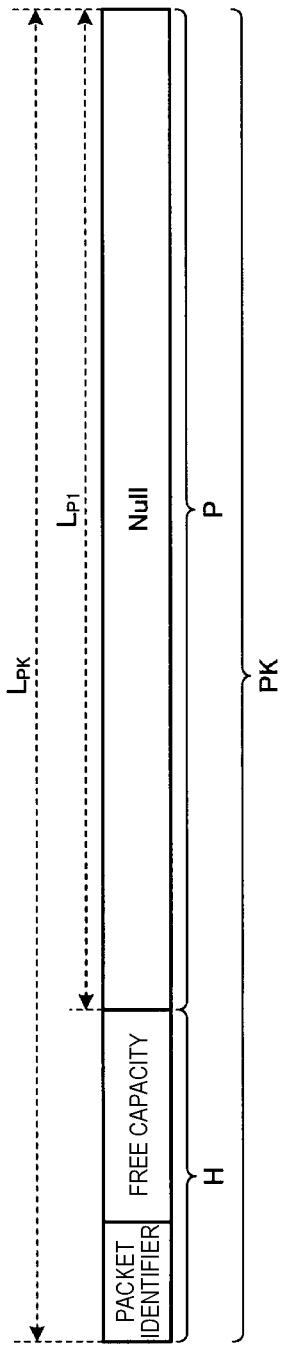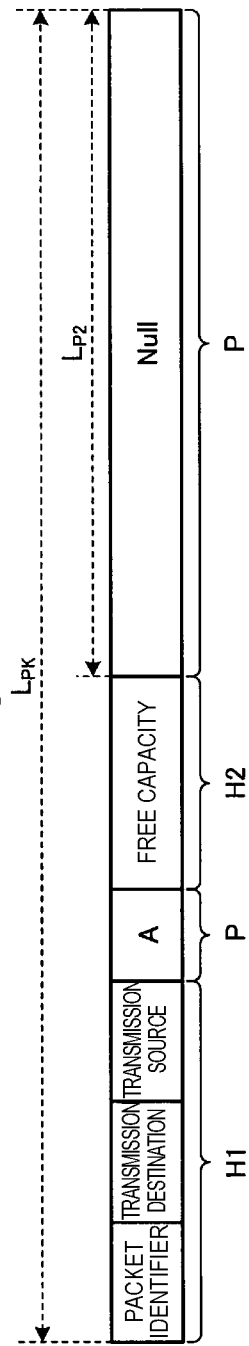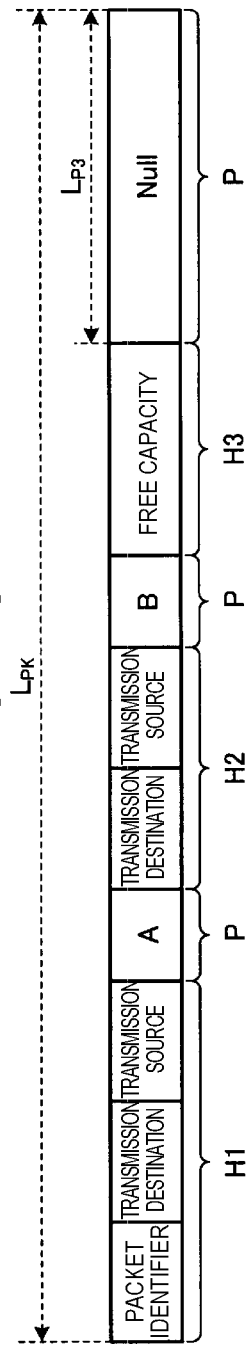

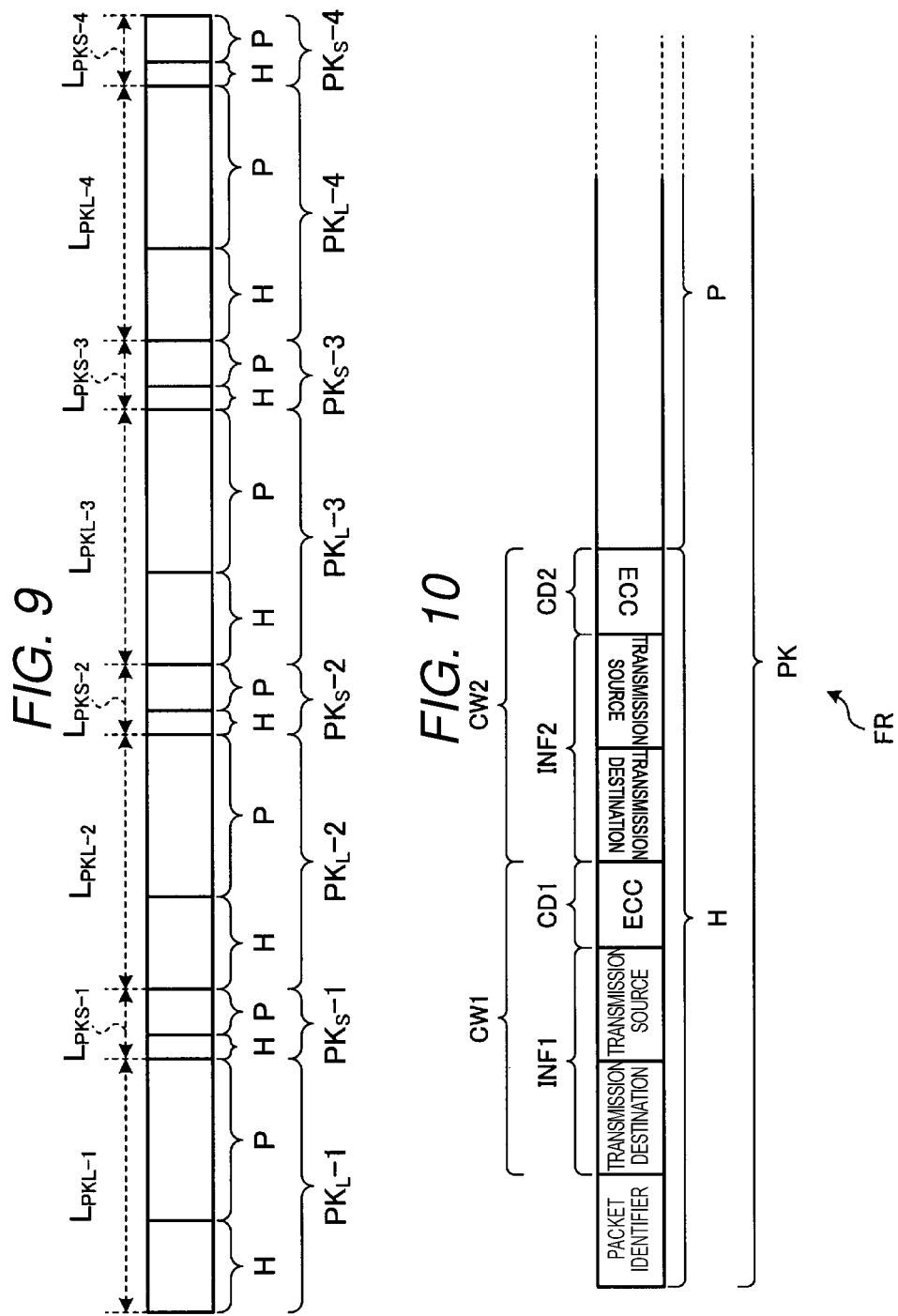

COMMUNICATION SYSTEM, MEMORY DEVICE, AND COMMUNICATION METHOD

CROSS-REFERENCE TO RELATED APPLICATION

This application is based upon and claims the benefit of priority from Japanese Patent Application No. 2020-050472, filed Mar. 23, 2020, the entire contents of which are incorporated herein by reference.

FIELD

Embodiments described herein relate generally to a communication system, a memory device, and a communication method.

BACKGROUND

In a communication system including a controller and a plurality of devices, the controller and the devices transfer packets via a communication path. In this case, it is desired to efficiently transfer the packets.

BRIEF DESCRIPTION OF THE DRAWINGS

FIGS. 4A and 4B are diagrams illustrating aspects of an operation of a communication system in a first embodiment.
FIGS. 7A, 7B, and 7C are diagrams of a communication frame in a third embodiment.
FIG. 9 is a diagram of a communication frame in a fourth embodiment.
FIG. 10 is a diagram of a header in a fifth embodiment.

DETAILED DESCRIPTION

Figure 1:
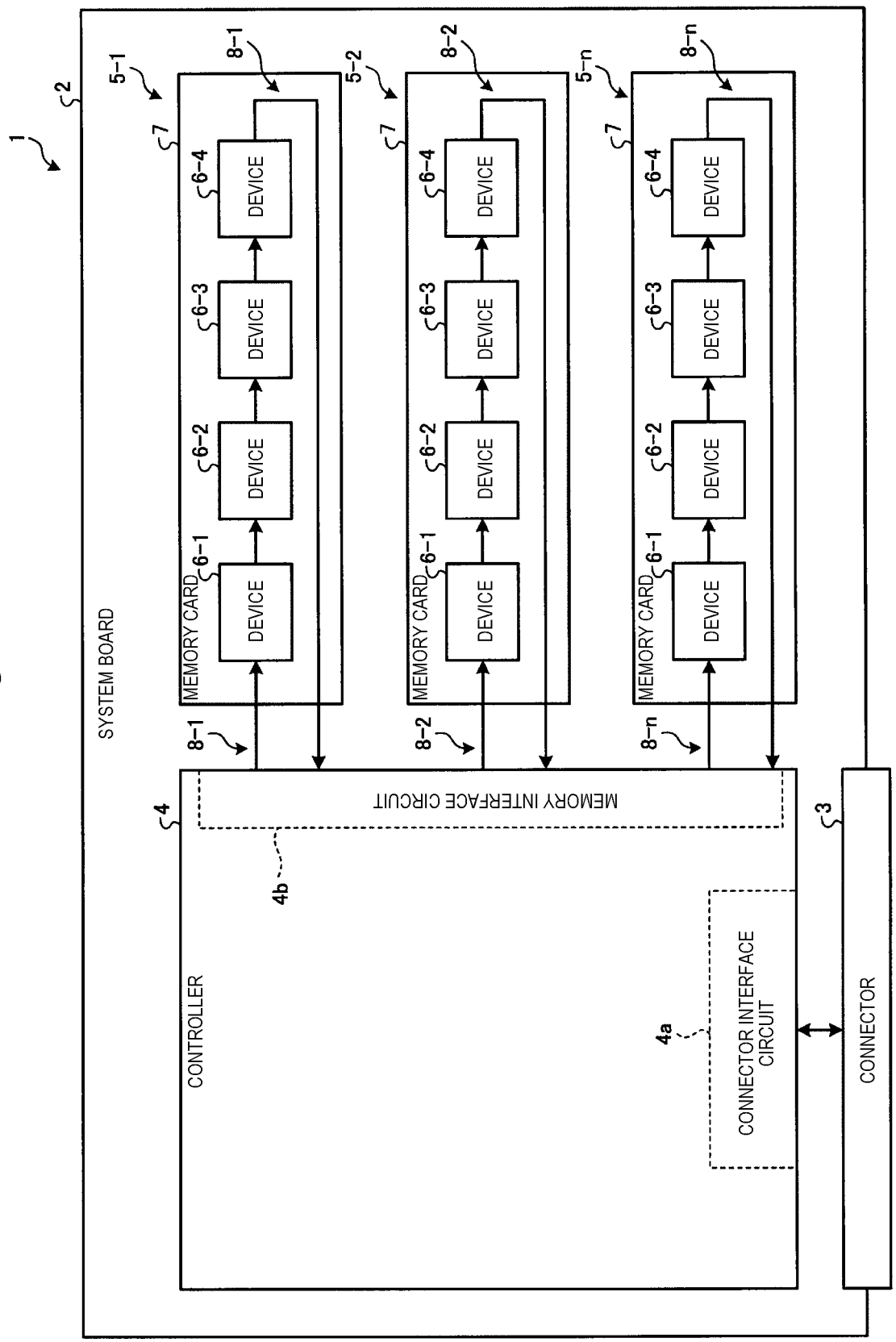
FIG. 1 is a diagram of a communication system according to a first embodiment.

In general, according to one embodiment, a communication system includes a controller, a plurality of devices, and a communication path. The plurality of devices is serially connected to the controller by the communication path. The communication path connects the controller to the plurality of devices in a loop. Each device has a different identifying address from each other device. The communication path is configured to transmit thereon a communication frame as a differential serial signal. The communication frame includes a plurality of packets. Each packet in the plurality of packets has a fixed data length. Each device is configured to insert data into, and extract data from, a packet in the communication frame.

Hereinafter, a communication system related to various example embodiments will be described with reference to the accompanying drawings. The present disclosure is not limited to these embodiments.

First Embodiment

A communication system related to a first embodiment includes a controller and a plurality of devices. The controller and the devices are connected via a communication path. In the communication system, the controller and the plurality of devices transfer packets via the communication path. For example, the device is a NAND flash memory chip, and the communication system is a solid state drive (SSD).

In such a communication system, a large capacity and high speed communication path is required. For example, an ultra-wide bandwidth (for example, 200 GB/s or more) and a large capacity may be required. When the communication system is applied to a storage of data handled by a graphic processing unit (GPU), in order to make full use of processing capability of the GPU, it is required that the communication system can exchange a large amount of data with the GPU at high speed. When the communication system is applied to machine learning of an artificial intelligence (AI) processor, in order to efficiently perform machine learning of the AI processor, it also is required that the communication system can exchange a large amount of data with the AI processor at high speed.

When performing high-speed communication, communication using a differential signal having excellent noise resistance is preferable. When communication uses a differential signal, a reliability of communication can be improved since noise between the differential signals can be canceled during reception and a signal reception processing can be performed more accurately.

In a communication system in which the controller and the plurality of devices are connected by a peer-to-peer communication path, in order to implement an ultra-wide bandwidth and a large capacity, a first technique in which a communication path between the controller and the plurality of devices is configured with a large number of communication lines may be considered. In the first technique, a huge number of connection pins are provided in the controller. For example, when each device includes 20 pins of 2 Gbps/pin and transmit and receive 8-bit data differentially at the same time, in order to implement 200 GB/s as the bandwidth of the communication path, 100 devices are connected. The controller is provided with 20×100=2000 pins. With this configuration, the cost of communication systems are significantly increased. That is, the first technique is not realistic for most applications.

In contrast, a second technique in which a communication system, in which a controller and a plurality of devices are connected by a ring-type communication path is configured, and the controller exclusively transmits the differential serial signal to the plurality of devices via the communication path can be considered. In the second technique, since each device is equipped with a high-speed serial interface (I/F) and a plurality of devices are serially connected to the controller in a loop (ring shape), it may be considered that high-speed communication can be implemented with a relatively smaller number of pins.

However, since a signal transmission from the controller to the plurality of devices is exclusive, there is a limit to data transfer efficiency from the controller to each device, and it is difficult to implement an ultra-wide bandwidth and a large capacity.

Accordingly, in a communication system according to a first embodiment, a communication frame transmitted on the ring-type communication path includes a plurality of packets each having a fixed data length and each device can insert or extract the packet into or from the communication frame according some predetermined condition(s), thereby achieving ultra-wide bandwidth and large capacity communication.

Specifically, a communication system 1 may be configured as illustrated in FIG. 1.

The communication system 1 includes a system board 2, a connector 3, a controller 4, a plurality of memory cards 5 (individually labeled 5-1 to 5-$n$), and a plurality of communication paths 8 (individually labeled 8-1 to 8-$n$).

The system board 2 is, for example, an accelerator board that supports ultra-wide bandwidth (for example, 200 GB/s or more) and large capacity.

The connector 3 is disposed on a part of the system board 2, and can be connected to another device (e.g., a computer or the like). The controller 4 includes a connector interface circuit 4$a$, and exchanges information with other devices via the connector interface circuit 4$a$ and the connector 3.

The memory cards 5-1 to 5-$n$ include a substrate 7 and a plurality of devices 6 (individually labeled 6-1 to 6-4) connected in series. The plurality of devices 6-1 to 6-4 are mounted on the substrate 7. The plurality of devices 6-1 to 6-4 can be arranged along the longitudinal direction of the substrate 7. Each device 6 is, for example, a memory device such as a NAND flash memory. The controller 4 includes a memory interface circuit 4$b$, and is communicatively connected to the plurality of devices 6-1 to 6-4 via the memory interface circuit 4$b$ and the communication path 8.

The controller 4 exchanges information with each device 6 via the memory interface circuit 4$b$ and the communication path 8. The memory interface circuit 4$b$ is configured to be able to transmit and receive a differential serial signal.

The plurality of communication paths 8-1 to 8-$n$ correspond to the plurality of memory cards 5-1 to 5-$n$. In each communication path 8, the memory interface circuit 4$b$ and the plurality of devices 6-1 to 6-4 in the corresponding memory card 5 are serially connected in a loop (ring shape). That is, the controller 4 and the device 6-1 are connected to each other via the communication path 8, the devices 6-1 to 6-4 are connected to each other in series via the communication path 8, and the device 6-4 and the controller 4 are also connected to each other via the communication path 8. Each communication path 8 can transmit the differential serial signal.

Each of the devices 6-1 to 6-4 is configured to be capable of transmitting and receiving the differential serial signal. Each of the devices 6-1 to 6-4 transmits and receives a communication frame using the differential serial signal via the communication path 8. The communication frame includes a plurality of packets. Each of the packets has a fixed data length. Each of the devices 6-1 to 6-4 executes insertion or extraction of a packet into or from a communication frame according to a predetermined condition. In this case, the communication frame may include the number of packets according to a desired bandwidth and a bandwidth limit of each device.

The communication system. 1 may have a configuration in which the system board 2 is omitted. That is, the connector interface circuit 4$a$ may be directly connected to an external device without the connector 3 in between. The system board 2 and the substrate (s) 7 may be integrally formed.

Figure 2:
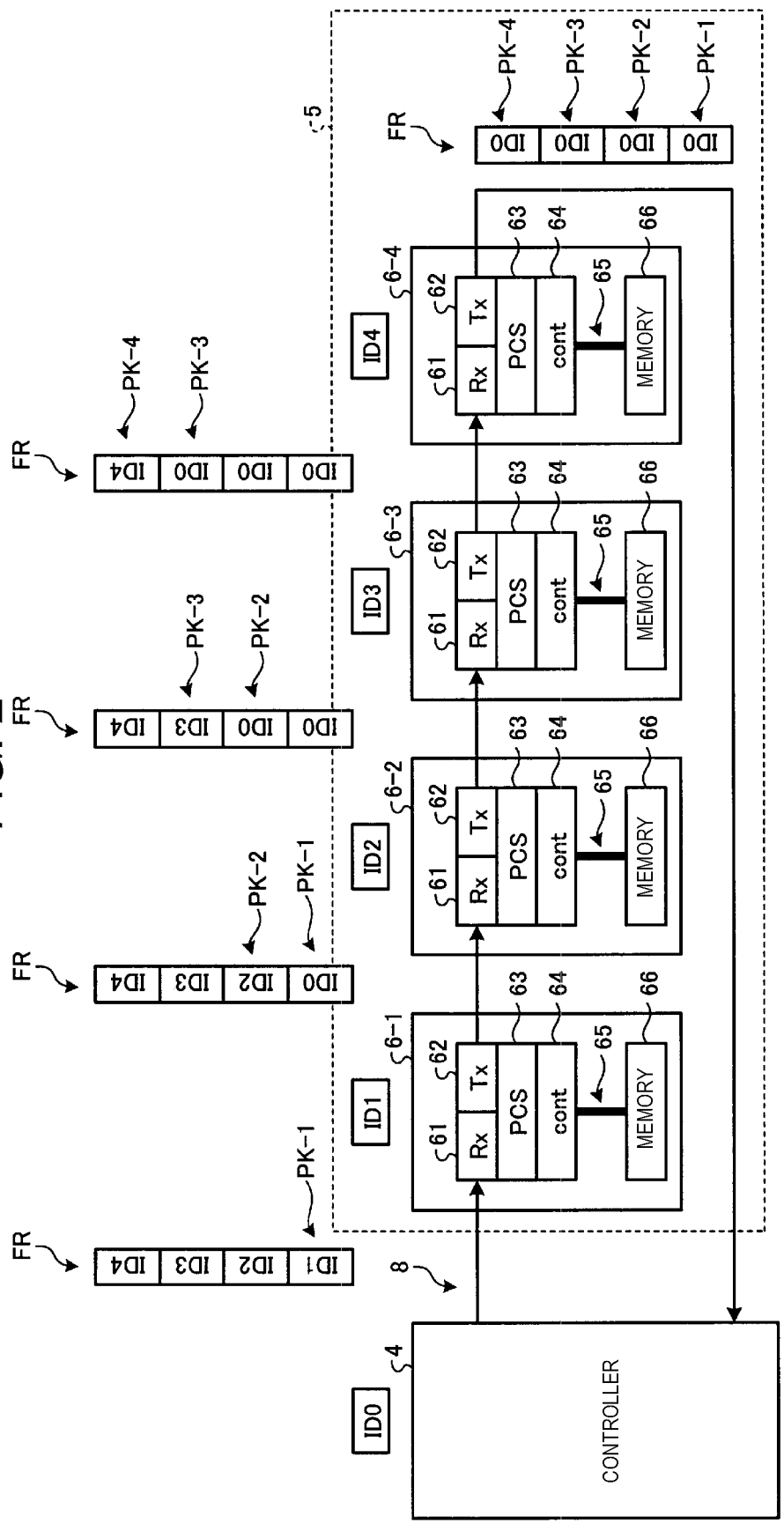
FIG. 2 is a diagram illustrating aspects related to configuration and operation of a communication system according to a first embodiment.

As illustrated in FIG. 2, each device 6 in this example includes a reception unit 61 ("Rx"), a transmission unit 62 ("Tx"), a protocol conversion unit 63 ("PCS"), a control circuit 64 ("cont"), an internal bus 65, and a memory 66. FIG. 2 is a diagram illustrating a configuration and an operation of the communication system 1. In FIG. 2 a connection configuration between the controller 4 and one memory card 5 is illustrated. The connection configuration for each memory card 5 is similar. The control circuit 64 is connected to the memory 66 via the internal bus 65 so as to be accessible. The memory 66 may be a non-volatile memory such as a NAND flash memory. Assuming that the communication bandwidth required for one memory card 5 is $B_{RE}$ and the communication bandwidth of the internal bus 65 is $B_{65}$, the number $N_P$ of packets PK to be included in the communication frame can be obtained by the following Expression 1.

$$N_P \geq B_{RE}/B_{65} \qquad \text{Expression 1}$$

For example, when the communication bandwidth required for the communication system 1 is 200 [Gbps] and the number n of memory cards 5 connected in parallel to the controller 4 is four, the bandwidth required for one memory card must be $B_{RE}$=200/4=50 [Gbps].

If the communication bandwidth of the internal bus 65 is $B_{65}$=14 [Gbps], then $N_P$=4 [packets] is obtained as the smallest integer that satisfies Expression 1. Thus, in this case, a communication frame FR would include four packets PK (PK-1 to PK-4) as illustrated in FIG. 3.

Figure 3:
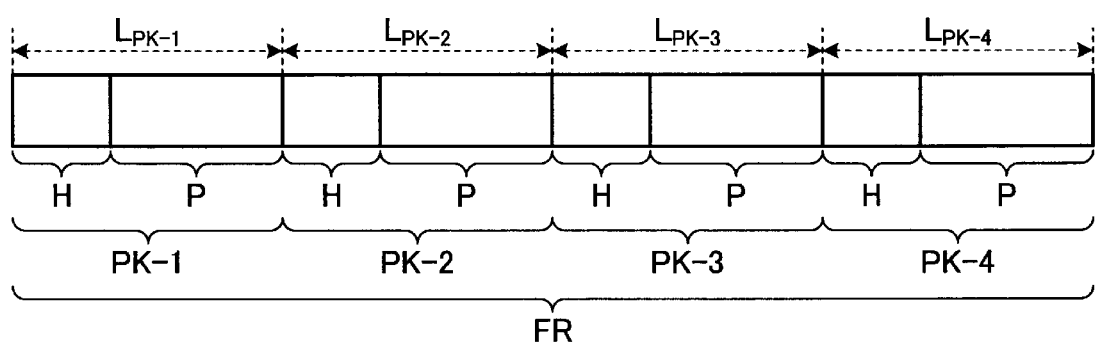
FIG. 3 is a diagram of a communication frame in a first embodiment.

FIG. 3 is a diagram illustrating a configuration of the communication frame FR. FIG. 3 illustrates a configuration in which the communication frame FR includes four packets, but this is just one example. Each communication frame FR includes information identifying any packets included in the communication frame FR (e.g., the four packets and any other packets in the communication frame FR). Packets PK-1, PK-2, PK-3, and PK-4 have fixed data lengths $L_{PK-1}$, $L_{PK-2}$, $L_{PK-3}$, and $L_{PK-4}$, respectively. The fixed data length $L_{PK}$ of each packet PK satisfies the following Expression 2.

$$L_{PK-1}=L_{PK-2}=L_{PK-3}=L_{PK-4} \qquad \text{Expression 2}$$

Each packet PK includes a header H and a payload P. In the plurality of packets PK-1 to PK-4, the headers H may have different data lengths and the payloads P may have different data lengths, but the fixed data length $L_{PK}$ of each packet PK satisfies Expression 2.

As illustrated in FIG. 2, when the communication frame FR is transmitted from the controller 4 through the communication path 8, each of the devices 6-1 to 6-4 executes insertion or extraction of the packet PK into or from the communication frame FR according to a predetermined condition. That is, the controller 4 transmits the communication frame FR configured as illustrated in FIG. 3 to the communication path 8 according to the number of $N_P$ determined by Expression 1. The required communication bandwidth $B_{RE}$ can be implemented by the devices 6-1 to 6-4 sequentially and in parallel inserting or extracting the packets PK in the communication frame FR in parallel.

Upon receiving a communication frame FR via the communication path 8, each device 6 confirms the header H of each of the packets PK in the communication frame FR. A particular device 6 then inserts or extracts a packet PK according to whether or not the header H of the packet PK includes identification information matching the particular device 6 as a transmission destination. That is, the device 6 can insert or extract data into or from a packet PK having a header H identifying the device 6 as a destination/addressee. Alternatively, the device 6 may insert a packet PK into the communication frame FR when at least one packet PK in the communication frame is a null packet. In this context, a null packet is a packet PK in which the payload P does not include valid data or is otherwise empty (Null). In many cases, a null packet may simply have a header which does not include valid address information indicating a transmission destination or for which the transmission destination is set as Null. A particular device 6 can insert or extract the information into or from the payload P corresponding to the header H which does not include the information of the transmission destination or in which the transmission destination is Null.

In each device 6, the Rx 61 is a physical layer, and receives the communication frame FR from the controller 4, or another device 6 in a previous position along the communication path 8, via the communication path 8. The Rx 61 performs physical processing such as waveform equalization on the received communication frame FR and supplies the communication frame FR to the PCS 63. The PCS 63 performs protocol conversion of the communication frame FR supplied from the Rx 61 of the physical layer to a communication frame of an upper layer. The upper layer is a layer higher than the physical layer when a communication layer structure is roughly divided into two, and includes, for example, a connection layer and a protocol conversion layer. The PCS 63 supplies the communication frame FR, which is subjected to protocol conversion to the upper layer, to the control circuit 64.

The control circuit 64 confirms the header H of each of the plurality of packets PK included in the communication frame FR. When the header H of the packet PK identifies the device 6 itself as the transmission destination, the control circuit 64 extracts the information from the payload P of the packet PK. When the extracted information is a write command and write data, the control circuit 64 accesses the memory 66 via the internal bus 65 and writes the write data in the memory 66 according to the write command.

When there is information to be included in the packet PK, the control circuit 64 changes the transmission destination information in the header H of the packet PK from the identification information for the device 6 to identification information for the controller 4. Likewise, the control circuit 64 changes the transmission source information from the identification information of the controller 4 to identification information of the device 6. The control circuit 64 further includes updated information into the payload P of the packet PK. When a read command is included in the packet PK of the received communication frame FR, the control circuit 64 includes read data received from the memory 66 via the internal bus 65 in the payload P of the packet PK. When there is no new information to be included in the packet PK, the control circuit 64 erases the information of the header H and the payload P of the packet PK to free the packet PK (Null) for other uses and updates the communication frame FR. The control circuit 64 supplies the updated communication frame FR to the PCS 63 as an upper layer communication frame FR.

Upon receiving the communication frame FR of the upper layer, the PCS 63 performs protocol conversion of the communication frame FR of the upper layer to the communication frame FR of the physical layer. The PCS 63 supplies the communication frame FR of the physical layer to the Tx 62. The Tx 62 is a physical layer, which performs physical processing such as waveform equalization on the communication frame FR supplied from the PCS 63 and transmits the communication frame FR on the communication path 8 to the next device 6 along the communication path 8 or the controller 4.

A use case illustrated in FIG. 2 can be considered as an example. In the communication system 1, identification information of the controller 4, the device 6-1, the device 6-2, the device 6-3, and the device 6-4 is set to ID0, ID1, ID2, ID3, and ID4, respectively. The controller 4 specifies one of ID1, ID2, ID3, and ID4 in the headers H of the four packets PK-1, PK-2, PK-3, and PK-4, respectively, and creates a communication frame FR in which the information to be sent to the devices 6 designated by the identification information is included in the corresponding payload P. The controller 4 transmits the created communication frame FR to the communication path 8.

Upon receiving the communication frame FR from the controller 4 via the communication path 8, the device 6-1 confirms the header H of each packet PK included in the received communication frame FR. As a result of the confirmation, the device 6-1 recognizes that the transmission destination of the packet PK-1 is itself (ID1), and extracts the information from the packet PK-1. When there is information to be sent to the controller 4 from the device 6-1, the device 6-1 rewrites the transmission destination of the header H of the packet PK-1 to the controller 4 (ID0) and the transmission source as itself (ID1), and includes the information to be sent in the payload P to update the communication frame FR. The device 6-1 then transmits the updated communication frame FR to the communication path 8.

Upon receiving the communication frame FR from the device 6-1 via the communication path 8, the device 6-2 confirms the header H of each packet PK included in the received communication frame FR. As a result of the confirmation, the device 6-2 recognizes that the transmission destination of the packet PK-2 is itself (ID2), and extracts the information from the packet PK-2. When there is information to be sent to the controller 4 from the device 6-2, the device 6-2 rewrites the transmission destination of the header H of the packet PK-2 to ID0 and the transmission source as itself (ID2), and updates the communication frame FR by including the information to be sent in the payload P. The device 6-2 then transmits the updated communication frame FR to the communication path 8.

Upon receiving the communication frame FR from the device 6-2 via the communication path 8, the device 6-3 confirms the header H of each packet PK included in the received communication frame FR. As a result of the confirmation, the device 6-3 recognizes that the transmission destination of the packet PK-3 is itself (ID3), and extracts the information from the packet PK-3. When there is information to be sent to the controller 4 from the device 6-3, the device 6-3 rewrites the transmission destination of the header H of the packet PK-3 to ID0 and the transmission source as itself (ID3), and updates the communication frame FR by including the information to be sent in the payload P. The device 6-3 then transmits the updated communication frame FR to the communication path 8.

Upon receiving the communication frame FR from the device 6-3 via the communication path 8, the device 6-4 confirms the header H of each packet PK included in the received communication frame FR. As a result of the confirmation, the device 6-4 recognizes that the transmission destination of the packet PK-4 is itself (ID4), and extracts the information from the packet PK-4. When there is information to be sent to the controller 4 from the device 6-4, the device 6-4 rewrites the transmission destination of the header H of the packet PK-4 to ID0 and the transmission source as itself (ID4), and updates the communication frame FR by including the information to be sent in the payload P. The device 6-4 then transmits the updated communication frame FR to the communication path 8.

Upon receiving the updated communication frame FR from the device 6-4 via the communication path 8, the controller 4 confirms the header H of each packet PK included in the received communication frame FR. The controller 4 performs, for example, a reception process on each of the packets PK-1 to PK-4 included in the communication frame FR according to the result of the confirmation, takes out information included in the payload P of each packet PK-1 to PK-4, and performs a predetermined process on or with the information. As a result of confirming the received communication frame FR, the controller 4 may confirm that the transmission destination of each of the packets PK-1 to PK-4 is itself and perform a reception process and other processing.

Figure 4A:
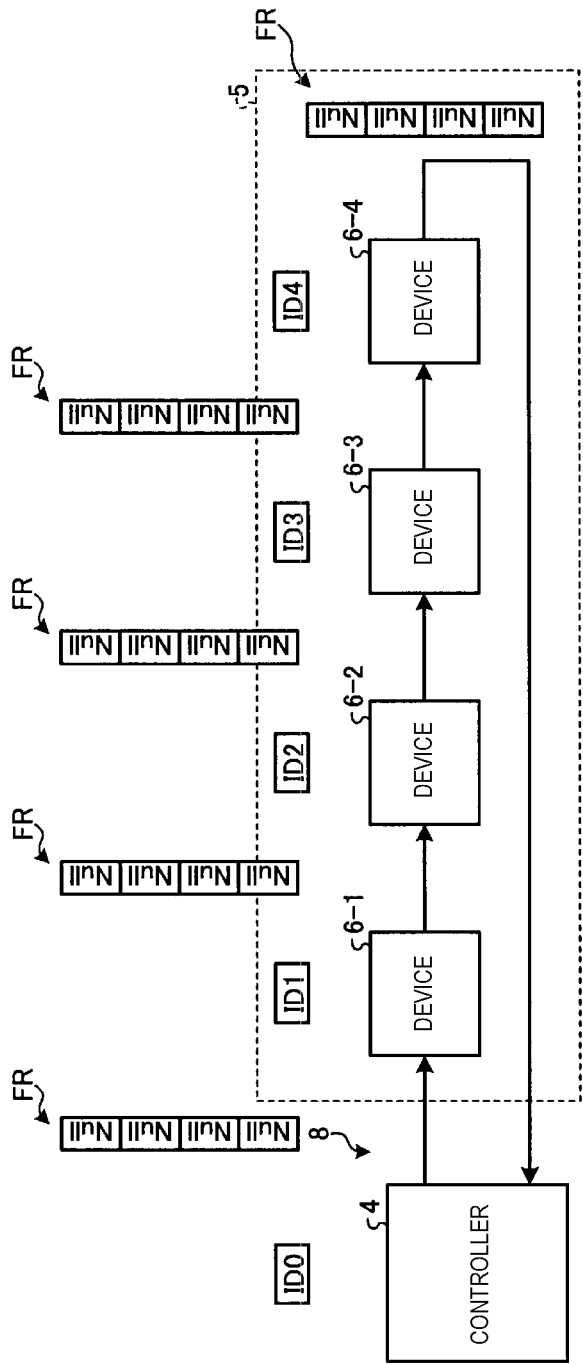

As another example, the use case illustrated in FIG. 4A can be considered. FIGS. 4A and 4B are diagram illustrating another operation of the communication system 1. In the communication system 1, the controller 4 creates a communication frame FR in which the headers H of the four packets PK-1, PK-2, PK-3, and PK-4 are all free (Null) and the payloads P of the four packets PK-1, PK-2, PK-3, and PK-4 are also all free (Null). That is, the four packets PK-1, PK-2, PK-3, and PK-4 are null/empty packets. The controller 4 transmits the created communication frame FR to the communication path 8.

Upon receiving the communication frame FR from the controller 4 via the communication path 8, the device 6-1 confirms the header H of each packet PK included in the received communication frame FR. As a result of the confirmation, the device 6-1 recognizes that there is no packet whose transmission destination is itself (ID1). When there is no information to be sent to the controller 4, the device 6-1 transmits the communication frame FR to the communication path 8 without updating the communication frame FR.

Upon receiving the communication frame FR from the device 6-1 via the communication path 8, the device 6-2 confirms the header H of each packet PK included in the received communication frame FR. As a result of the confirmation, the device 6-2 recognizes that there is no packet whose transmission destination is itself (ID2). When there is no information to be sent to the controller 4, the device 6-2 transmits the communication frame FR to the communication path 8 without updating the communication frame FR.

Upon receiving the communication frame FR from the device 6-2 via the communication path 8, the device 6-3 confirms the header H of each packet PK included in the received communication frame FR. As a result of the confirmation, the device 6-3 recognizes that there is no packet whose transmission destination is itself (ID3). When there is no information to be sent to the controller 4, the device 6-3 transmits the communication frame FR to the communication path 8 without updating the communication frame FR.

Upon receiving the communication frame FR from the device 6-3 via the communication path 8, the device 6-4 confirms the header H of each packet PK included in the received communication frame FR. As a result of the confirmation, the device 6-4 recognizes that there is no packet whose transmission destination is itself (ID4). When there is no information to be sent to the controller 4, the device 6-4 transmits the communication frame FR to the communication path 8 without updating the communication frame FR.

Upon receiving the communication frame FR from the device 6-4 via the communication path 8, the controller 4 confirms the header H of each packet PK included in the received communication frame FR. The controller 4 performs a reception process on each of the packets PK-1 to PK-4 included in the communication frame FR according to the result of the confirmation. For example, as a result of confirming the received communication frame FR, the controller 4 confirms that there is no packet PK in which the transmission destination is itself (controller 4 (ID0)).

As another example, the use case illustrated in FIG. 4B can be considered. The controller 4 creates a communication frame FR in which the headers H of the four packets PK-1, PK-2, PK-3, and PK-4 are all free (Null) and the payloads P of the four packets PK-1, PK-2, PK-3, and PK-4 are also all free (Null). That is, also in this use case, all four packets PK-1, PK-2, PK-3, and PK-4 are null packets. The controller 4 transmits the created communication frame FR to the communication path 8.

Upon receiving the communication frame FR from the controller 4 via the communication path 8, the device 6-1 confirms the header H of each packet PK included in the received communication frame FR. As a result of the confirmation, the device 6-1 recognizes that there is no packet whose transmission destination is itself (ID1). When there is no information to be sent to the controller 4, the device 6-1 transmits the communication frame FR to the communication path 8 without updating the communication frame FR.

Upon receiving the communication frame FR from the device 6-1 via the communication path 8, the device 6-2 confirms the header H of each packet PK included in the received communication frame FR. As a result of the confirmation, the device 6-2 recognizes that there is no packet whose transmission destination is itself (ID2). When there is information to be sent to the controller 4, the device 6-2 can select any null packet included in the communication frame FR and insert the information to be sent. The device 6-2 selects, for example, the packet PK-1, adds information, which designates the transmission destination as the controller 4 (ID0) and the transmission source as itself (ID2), to the header H of the packet PK-1, and includes the information to be sent in the payload P to update the communication frame FR. The device 6-2 transmits the updated communication frame FR to the communication path 8.

Upon receiving the communication frame FR from the device 6-2 via the communication path 8, the device 6-3 confirms the header H of each packet PK included in the received communication frame FR. As a result of the confirmation, the device 6-3 recognizes that there is no packet whose transmission destination is itself (ID3). When there is no information to be sent to the controller 4, the device 6-3 transmits the communication frame FR to the communication path 8 without updating the communication frame FR.

Upon receiving the communication frame FR from the device 6-3 via the communication path 8, the device 6-4 confirms the header H of each packet PK included in the received communication frame FR. As a result of the confirmation, the device 6-4 recognizes that there is no packet whose transmission destination is itself (ID4). When there is no information to be sent to the controller 4, the device 6-4 transmits the communication frame FR to the communication path 8 without updating the communication frame FR.

Upon receiving the updated communication frame FR from the device 6-4 via the communication path 8, the controller 4 confirms the header H of each packet PK included in the received communication frame FR. The controller 4 recognizes that the packet PK-1 is not a null packet among the plurality of packets PK-1 to PK-4 included in the communication frame FR, according to the confirmation result. In response to this, the controller 4 performs a reception process on the packet PK-1, takes out information included in the payload P of the packet PK-1, and performs a predetermined process.

When the use case of FIG. 2 and the use case of FIG. 4B are compared, in the communication frame FR, the position or number of the packet PK including the information that the device 6-2 intends to transmit to the controller 4 is different. That is, when the communication frame FR includes a plurality of null packets, each device 6 can select any packet from the available plurality of null packets and include the information intended to be transmitted therein.

As described above, in the communication system 1, the communication frame FR transmitted through the ring-type communication path 8 includes a plurality of packets PK-1 to PK-4 each having a fixed data length. Each device 6 inserts or extracts a packet PK into or from the communication frame FR according to a predetermined condition. With this configuration, communication between the controller 4 and the plurality of devices 6 via the connection-in-a-ring-type can be made to have an ultra-wide bandwidth and a large capacity.

In the first embodiment, although a configuration in which the number of devices serially connected to the controller 4 in a loop (ring shape) to the controller 4 coincides with the number of packets included in the communication frame FR has been illustrated, in other examples, the number of devices ring-connected to the controller 4 may be less than the number of packets included in the communication frame FR.

Second Embodiment

Next, a communication system 101 related to a second embodiment will be described. In the following, the description will focus primarily on the parts that are different from the first embodiment.

In the first embodiment, a communication protocol in which, when the communication frame FR includes a plurality of null packets PK, permits each device 6 to select anyone of the available packet PK from the plurality of null packets, and if there is information to be transmitted. The information to be transmitted can then be included in the selected packet PK as described.

If the number of devices that are serially connected is equal to or less than the number of packets PK included in the communication frame FR, a situation does not occur in which there is no packet PK available for including information to be transmitted from a particular device 6.

However, when the number of devices that are serially connected in a ring shape (loop) is greater than the number of packets PK included in the communication frame FR, then for a device 6 downstream from other devices 6 along the communication path 8, the situation in which there is no packet PK available to this downstream device 6 for including information to be transmitted may occur.

Figure 5:
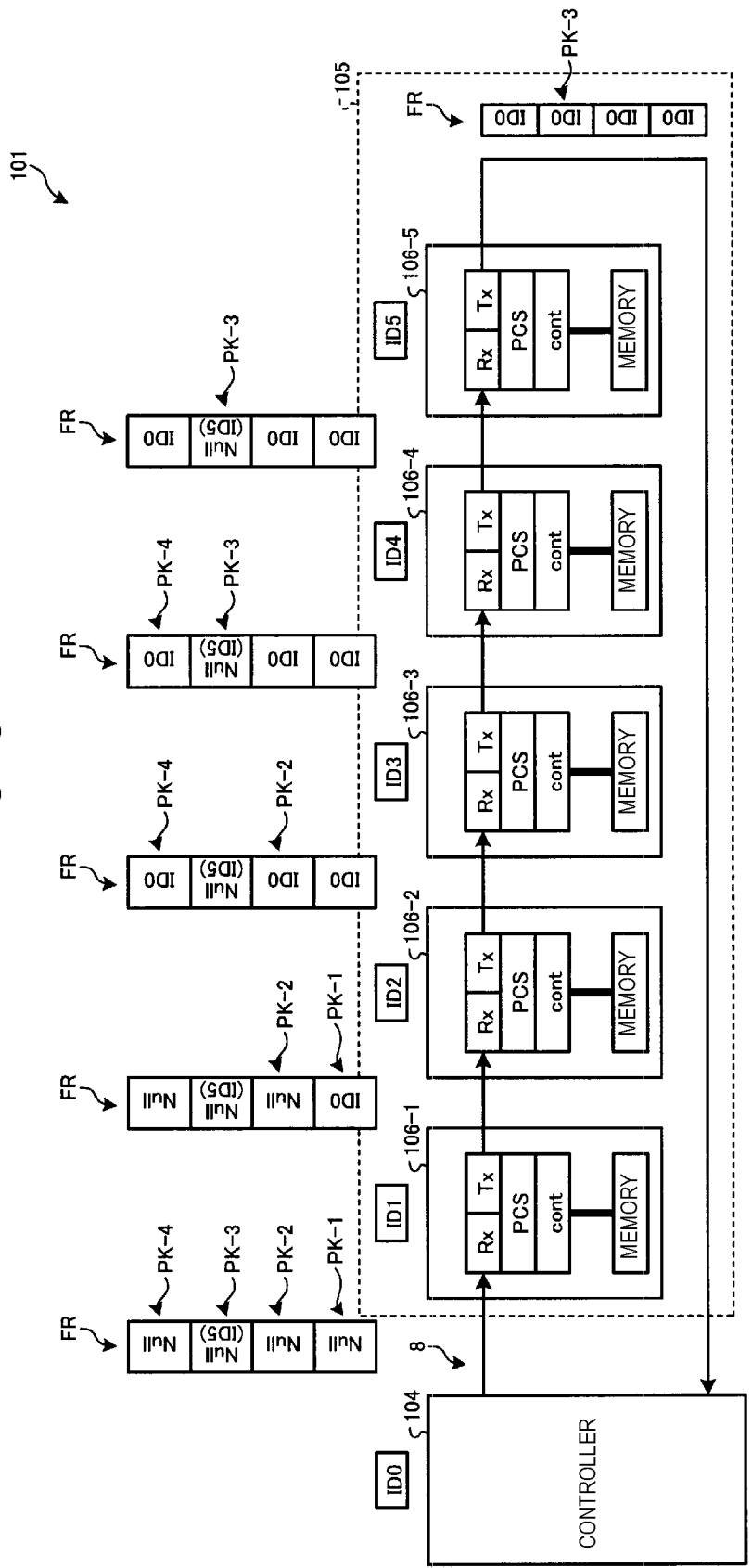
FIG. 5 is a diagram illustrating aspects related to configuration and operation of a communication system according to a second embodiment.

Here, a communication system 101 related to the second embodiment will be described with reference to FIG. 5. Specifically, in the communication system. 101 illustrated in FIG. 5, each memory card 105 includes, for example, five devices 106 (106-1 to 106-5). FIG. 5 is a diagram illustrating a configuration and an operation of the communication system 101 in the second embodiment. Five devices 106-1 to 106-5 are connected to the controller 104 in a serial loop (ring shape) via the communication path 8. The communication frame FR includes four packets PK-1 to PK-4. The number of devices (five devices) 106 that are serially connected is greater than the number of packets PK (four packets) included in the communication frame FR.

For example, when the communication frame FR includes four null packets, and four of the five devices 106-1 to 6-4 have information to be transmitted in each of the four null packets, then the four of the five devices 106-1 to 6-4 can simply include the information to be transmitted in the four null packets, but the device 106-5 at the most downstream side of the connection-in-a-ring-type receives the communication frame FR that no longer includes any null packet. With this configuration, the device 106-5 cannot include its information to be transmitted in the communication frame FR even though there is the information to be transmitted.

In this embodiment, in order to avoid this problem, it is possible to add identification information indicating the transmission destination in the header H of the null packet PK. A null packet to which a transmission destination is added allows a device 106 designated by the identification information in the header H to selectively insert information to be transmitted into the packet. An addressed null packet may be considered as reserved for use by the addressee device 106.

As an example, the use case illustrated in FIG. 5 can be considered. In the communication system 101, the identification information of the controller 104, the device 106-1, the device 106-2, the device 106-3, the device 106-4, and the device 106-5 is respectively set to ID0, ID1, ID2, ID3, ID4, and ID5. The controller 104 creates a communication frame FR in which the headers H of the four packets PK-1, PK-2, PK-3, and PK-4 are free (Null) and the payloads P of the four packets PK-1, PK-2, PK-3, and PK-4 are free (Null). In this case, when there is a possibility that the device 106-5 transmits information having a high priority, the controller 104 creates a communication frame FR in which the identification information ID5 is designated as the transmission destination in the header H of one packet PK (for example, packet PK-3) and the transmission destination is not designated in the header H of other packets PK. The controller 104 transmits the created communication frame FR to the communication path 8.

Upon receiving the communication frame FR from the controller 104 via the communication path 8, the device 106-1 confirms the header H of each packet PK included in the received communication frame FR. As a result of the confirmation, the device 106-1 recognizes that there is no packet whose transmission destination is itself (ID1). When there is information to be sent to the controller 104, the device 106-1 can select any null packet other than the packet PK-3 (whose destination has been indicated in the header H) and insert or extract the information to be sent in the communication frame FR. The device 106-1 selects, for example, the packet PK-1, and rewrites the transmission destination of the header H of the packet PK-1 to the controller 104 (ID0) and the transmission source to itself (ID1) and includes the information to be transmitted in the payload P to update the communication frame FR. The device 106-1 transmits the updated communication frame FR to the communication path 8.

Upon receiving the communication frame FR from the device 106-1 via the communication path 8, the device 106-2 confirms the header H of each packet PK included in the received communication frame FR. As a result of the confirmation, the device 106-2 recognizes that there is no packet whose transmission destination is itself (ID2). When there is information to be sent to the controller 104, the device 106-2 can select any null packet other than the packet PK-3 and insert or extract the information to be sent in the communication frame FR. The device 106-2 selects, for example, the packet PK-2, and rewrites the transmission destination of the header H of the packet PK-2 to the ID0 and the transmission source to itself (ID2) and includes the information to be transmitted in the payload P to update the communication frame FR. The device 106-2 transmits the updated communication frame FR to the communication path 8.

Upon receiving the communication frame FR from the device 106-2 via the communication path 8, the device 106-3 confirms the header H of each packet PK included in the received communication frame FR. As a result of the confirmation, the device 106-3 recognizes that there is no packet whose transmission destination is itself (ID3). When there is information to be sent to the controller 104, the device 106-3 can select any null packet other than the packet PK-3 and insert or extract the information to be sent in the communication frame FR. The device 106-3 selects, for example, the packet PK-4, and rewrites the transmission destination of the header H of the packet PK-4 to the ID0 and the transmission source to itself (ID3) and includes the information to be transmitted in the payload P to update the communication frame FR. The device 106-3 transmits the updated communication frame FR to the communication path 8.

Upon receiving the communication frame FR from the device 106-3 via the communication path 8, the device 106-4 confirms the header H of each packet PK included in the received communication frame FR. As a result of the confirmation, the device 106-4 recognizes that there is no packet whose transmission destination is itself (ID4). Further, the device 106-4 recognizes that there is no null packet other than the packet PK-3 in the communication frame FR. In response to this, the device 106-4 transmits the communication frame FR to the communication path 8 without updating the communication frame FR even if there is information to be transmitted.

Upon receiving the communication frame FR from the device 106-4 via the communication path 8, the device 106-5 confirms the header H of each packet PK included in the received communication frame FR. As a result of the confirmation, the device 106-5 recognizes that the transmission destination of the packet PK-3 is itself (ID5). Since there is information to be sent to the controller 104, the device 106-5 rewrites the transmission destination of the header H of the packet PK-3 to ID0 and the transmission source to itself (ID5) and includes the information to be transmitted in the payload P to update the communication frame FR. The device 106-5 transmits the updated communication frame FR to the communication path 8.

Upon receiving the updated communication frame FR from the device 106-5 via the communication path 8, the controller 104 confirms the header H of each packet PK included in the received communication frame FR. The controller 104 performs, for example, a reception process on each of the packets PK-1 to PK-4 included in the communication frame FR according to the result of the confirmation, takes out information included in the payload P of each packet PK-1 to PK-4, and performs a predetermined process.

As described above, in the second embodiment, when there is a packet PK which is a null packet but includes the identification information of a particular device 106 as the transmission destination in a header H thereof, only the addressed device 106 can insert data to be transmitted into the reserved packet PK in the received communication frame FR. If there is a null packet for which transmission destination is not specified as any particular device 106 in the received communication frame FR, then each device 106 can insert the data to be transmitted in the null packet. With this configuration, when the priority of information to be transmitted by the device 106 is high, the bandwidth can be guaranteed for the information.

Third Embodiment

Next, a communication system 201 related to a third embodiment will be described. In the following, the description will primarily focus on the parts that are different from the first and second embodiments.

In the first embodiment, a communication protocol in which when each device 6 has information to be transmitted, the payload P of the packet PK having a fixed data length is transmitted by including the information to be transmitted was exemplified.

When a data length of the information to be transmitted is a length corresponding to the data length of the payload P, data transfer can be efficiently performed.

However, when the information to be transmitted is information having a short data length such as an acknowledgment (ACK) indicating successful reception or a control code, since the data length of the packet PK is fixed, the data transfer efficiency may decrease due to wasteful consumption of the bandwidth.

Therefore, in this embodiment, a plurality of pieces of information having a short data length can be put in one packet, size permitting. Further, by adding free capacity information to a null packet or a packet in which short length information is stored, each subsequent device can determine whether or not additional short length information can be added.

Figure 6:
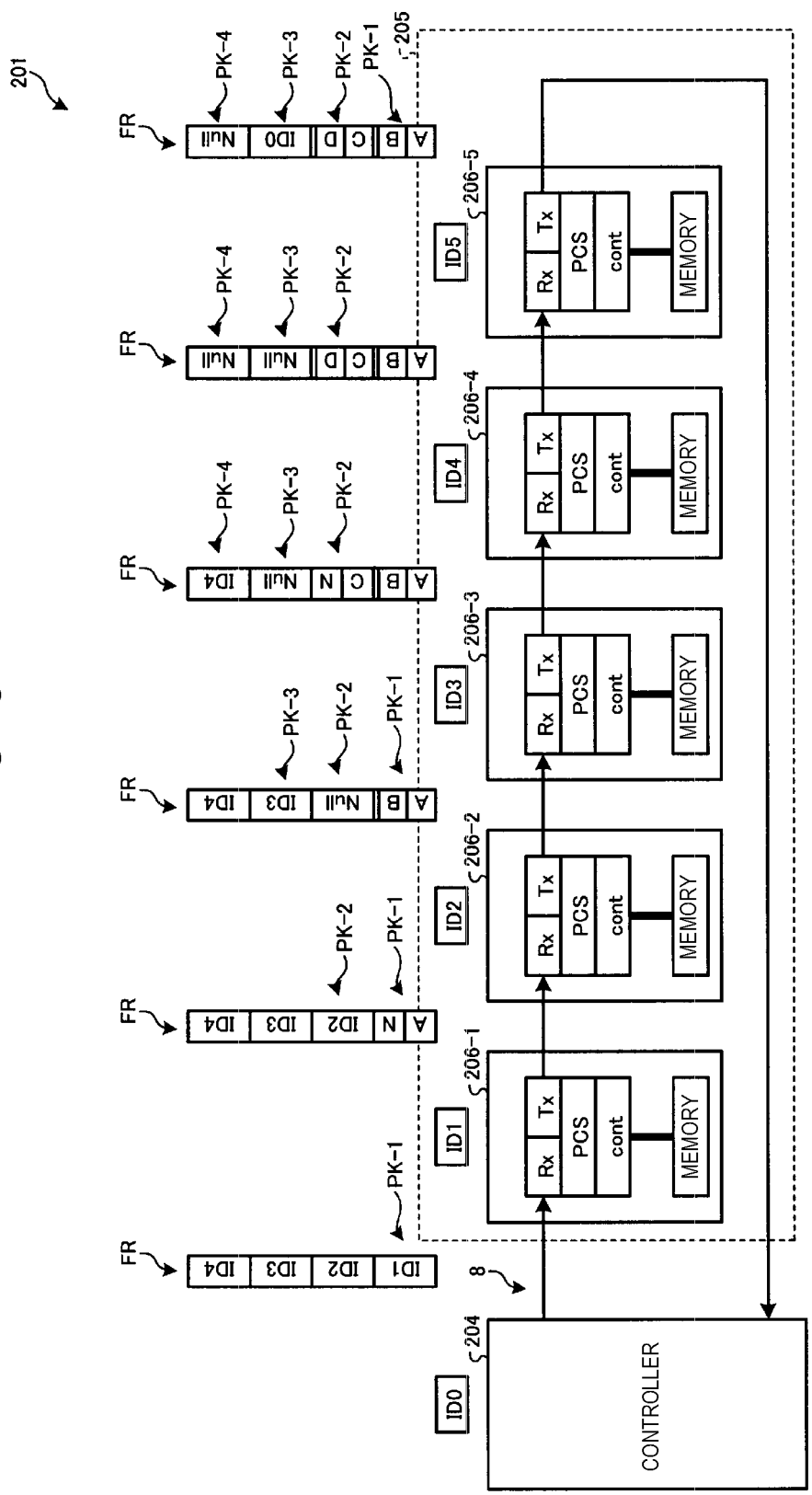
FIG. 6 is a diagram illustrating aspects related to configuration and operation of a communication system according to a third embodiment.

Specifically, as illustrated in FIG. 7A, in the communication system 201 illustrated in FIG. 6, a controller 204 and/or each device 206 (206-1 to 206-5) of a memory card 205 adds free capacity information to the header H in addition to a packet identifier and the like. The free capacity information indicates a data length $L_{P1}$ of the payload P that is still free (Null). In this case, a data length $L_{PK}$ of the packet PK (null packet) is fixed. When generating or updating the communication frame FR including the null packet, each device 206 adds the free capacity information to the header H of the null packet.

Upon recognizing the null packet in the communication frame FR, each device 206 refers to the free capacity information of the header H as illustrated in FIG. 7A. Each device 206 adds a new header H together with short information A when the short information A can be added according to the free capacity information. Specifically, as illustrated in FIG. 7B, each device 206 erases the free capacity information from the referred header H, adds the identification information of the transmission destination and the identification information of the transmission source as the first header H1 to update the header H, and adds the short information A to the payload P. Then, a data length $L_{P2}$ of the remaining payload P when the second header H2 is added is obtained, free capacity information indicating the data length $L_{P2}$ is generated and added as a second header H2. At this time, the remaining payload P is free (Null).

Upon recognizing a packet (quasi-null packet) which is a null packet but with the short information A added thereto is recognized in the communication frame FR, each device 206 refers to the free capacity information of the second header H2 as illustrated in FIG. 7B. Each device 206 adds a new header H together with short information B when the short information B can be added according to the referred free capacity information. Specifically, as illustrated in FIG. 7C, each device 206 erases the free capacity information from the referred second header H, adds the identification information of the transmission destination and the identification information of the transmission source as the second header H2 to update the header H, and adds the short information B to the payload P. Then, a data length $L_{P3}$ of the remaining payload P when the third header H3 is added is obtained, free capacity information indicating the data length $L_{P3}$ is generated and added as a third header H3. At this time, the remaining payload P is free (Null). That is, as illustrated in FIGS. 7A to 7C, each device 206 can insert a plurality of sets (data groups) each including a header and a payload in a null packet. In the case of FIG. 7C, the header H1 and the payload P in which the information A is stored are included in one set/group. The header H2 and the payload P in which the information B is stored are included in another set/group.

As an example, the use case illustrated in FIG. 6 can be considered. In the communication system 201, the identification information of the controller 204, the device 206-1, the device 206-2, the device 206-3, the device 206-4, and the device 206-5 is respectively set to ID0, ID1, ID2, ID3, ID4, and ID5. The controller 204 designates the identification information ID1, ID2, ID3, and ID4 as the transmission destinations in the headers H of the four packets PK-1, PK-2, PK-3, and PK-4, respectively, and includes information to be sent to the device 206 designated by the identification information in the corresponding payload P to create the communication frame FR. The controller 204 transmits the created communication frame FR to the communication path 8.

Upon receiving the communication frame FR from the controller 204 via the communication path 8, the device 206-1 confirms the header H of each packet PK included in the received communication frame FR. As a result of the confirmation, the device 206-1 recognizes that the transmission destination of the packet PK-1 is itself (ID1), and extracts the information from the packet PK-1. The device 206-1 treats the packet PK-1 as a null packet, and adds free capacity information to the header H of the null packet in addition to the packet identifier and the like. When the information A to be sent to the controller 204 is the short information A, the device 206-1 erases the free capacity information from the header H of the received packet PK, adds the controller 204 (ID0) as the identification information of the transmission destination and the identification information (ID1) of the transmission source to the first header H1 to update the header H, and adds the short information A to the payload P of the packet. Then, the device 206-1 obtains the data length $L_{P2}$ of the payload P when the second header H2 is further added, and generates free capacity information indicating the data length $L_{P2}$ and adds the free capacity information to the second header H2 to update the communication frame FR. The device 206-1 transmits the updated communication frame FR to the communication path 8.

Upon receiving the communication frame FR from the device 206-1 via the communication path 8, the device 206-2 confirms the header H of each packet PK included in the received communication frame FR. As a result of the confirmation, the device 206-2 recognizes that the transmission destination of the packet PK-2 is itself (ID2), and extracts the information from the packet PK-2. The device 206-2 treats the packet PK-2 as a null packet, and adds free capacity information to the header H of the null packet (packet PK-2) in addition to the packet identifier and the like. When information to be sent to the controller 204 is the short information B, the device 206-2 recognizes the quasi-null packet PK-1 in the communication frame FR and refers to the free capacity information of the second header H2. The device 206-2 determines whether the short information B can be added according to the free capacity information. When it is determined that the short information B can be added, the device 206-2 erases the free capacity information from the second header H2, and adds the identification information (ID0) of the transmission destination and the identification information (ID2) of the transmission source to the second header H2 to update the header H, and adds the short information B to the payload P of the packet. Then, the device 206-2 obtains the data length $L_{P3}$ of the payload P when the third header H3 is further added, and generates free capacity information indicating the data length $L_{P3}$ and adds the free capacity information to the third header H3 to update the communication frame FR. The device 206-2 transmits the updated communication frame FR to the communication path 8.

Upon receiving the communication frame FR from the device 206-2 via the communication path 8, the device 206-3 confirms the header H of each packet PK included in the received communication frame FR. As a result of the confirmation, the device 206-3 recognizes that the transmission destination of the packet PK-3 is itself (ID3), and extracts the information from the packet PK-3. The device 206-3 treats the packet PK-3 as a null packet, and adds free capacity information to the header H of the null packet in addition to the packet identifier and the like.

When information to be sent to the controller 204 is the short information C, the device 206-3 recognizes the quasi-null packet PK-1 in the communication frame FR and refers to the free capacity information of the third header H3. The device 206-3 determines that the short information C cannot be added according to the free capacity information.

For that reason, the device 206-3 recognizes the null packet PK-2 in the communication frame FR and refers to the free capacity information in the header H. The device 206-3 determines whether the short information C can be added according to the free capacity information.

When it is determined that the short information C can be added, the device 206-3 erases the free capacity information from the header H of the received packet PK (null packet PK-2), and adds the identification information (ID0) of the transmission destination and the identification information (ID3) of the transmission source to the first header H1 to update the header H, and adds the short information C to the payload P of the packet.

Then, the data length $L_{P2}$ of the payload P when the second header H2 is further added is obtained, free capacity information indicating the data length $L_{P2}$ is generated and added to the second header H2, and the communication frame FR is updated. The device 206-3 transmits the updated communication frame FR to the communication path 8.

Upon receiving the communication frame FR from the device 206-3 via the communication path 8, the device 206-4 confirms the header H of each packet PK included in the received communication frame FR. As a result of the confirmation, the device 206-4 recognizes that the transmission destination of the packet PK-4 is itself (ID4), and extracts the information from the packet PK-4.

The device 206-4 treats the packet PK-4 as a null packet, and adds free capacity information to the header H of the null packet in addition to the packet identifier and the like. When information to be sent to the controller 204 is the short information D, the device 206-4 recognizes the quasi-null packet PK-2 in the communication frame FR and refers to the free capacity information of the second header H2. The device 206-4 then determines whether the short information D can be added according to the free capacity information.

When it is determined that the short information D can be added, the device 206-4 erases the free capacity information from the second header H2, and adds the identification information (ID0) of the transmission destination and the identification information (ID4) of the transmission source to the second header H2 to update the header H, and adds the short information D to the payload P of the packet.

Then, the device 206-4 obtains the data length $L_{P3}$ of the payload P when the third header H3 is further added, and generates free capacity information indicating the data length $L_{P3}$ and adds the free capacity information to the third header H3 to update the communication frame FR. The device 206-4 transmits the updated communication frame FR to the communication path 8.

Upon receiving the communication frame FR from the device 206-4 via the communication path 8, the device 206-5 confirms the header H of each packet PK included in the received communication frame FR. As a result of the confirmation, the device 206-5 recognizes that there is no packet whose transmission destination is itself (ID5). When there is information E to be sent to the controller 204, the device 206-5 can select any null packet included in the communication frame FR and insert the information E thereto.

Here, the device 206-5 selects, for example, the packet PK-3, and erases the free capacity information from the header H of the packet PK-3, adds information that designates the transmission destination as (ID0) and the transmission source as itself (ID5) to the header, and includes the information E in the payload P to update the communication frame FR. The device 206-5 transmits the updated communication frame FR to the communication path 8.

Upon receiving the updated communication frame FR from the device 206-5 via the communication path 8, the controller 204 confirms each header H of each packet PK included in the received communication frame FR. The controller 204 performs a reception process on each of the packets PK-1 to PK-3 but excluding the null packet PK-4 in the communication frame FR according to the result of the confirmation, and takes out the information included in the payload P of each of the packets PK-1 to PK-3.

In the use case illustrated in FIG. 6, although a case where the device 206-3 cannot add the short information C to the quasi-null packet PK-1 is illustrated, if the short information C can be added to the quasi-null packet PK-1, the device 206-3 may add the short information C thereto. That is, when it is determined that the short information C can be added according to the free capacity information in the quasi-null packet PK-1, the device 206-3 may erase the free capacity information from the third header H3, add the identification information (ID0) of the transmission destination and the identification information (ID2) of the transmission source to the third header H3 to update the header, and add the short information C to the payload P of the packet.

Similarly, when it is determined that the short information D can be added according to the free capacity information in the quasi-null packet PK-1, the device 206-4 may erase the free capacity information from the third header H3, add the identification information (ID0) of the transmission destination and the identification information (ID2) of the transmission source to the fourth header H4 to update the header, and add the short information D to the payload P of the packet.

As described above, in the third embodiment, a plurality of pieces of information having a short data length can be included in the same packet. By adding free capacity information to a null packet or a packet including only short information, each subsequent device can determine whether or not additional short information can be added to a packet. With this configuration, wasteful consumption of bandwidth can be reduced, and data transfer efficiency can be improved.

Fourth Embodiment

Next, a communication system 201 related to a fourth embodiment will be described. In the following, the description will primarily focus on the parts that are different from the first to third embodiments.

Although the data transfer efficiency is improved by allowing a plurality of pieces of information having a short data length to be included in one packet in the third embodiment, the data transfer efficiency can be improved by preparing a packet having a long data length and a packet having a short data length and including information having a short data length in the short packet in a fourth embodiment.

Figure 8:
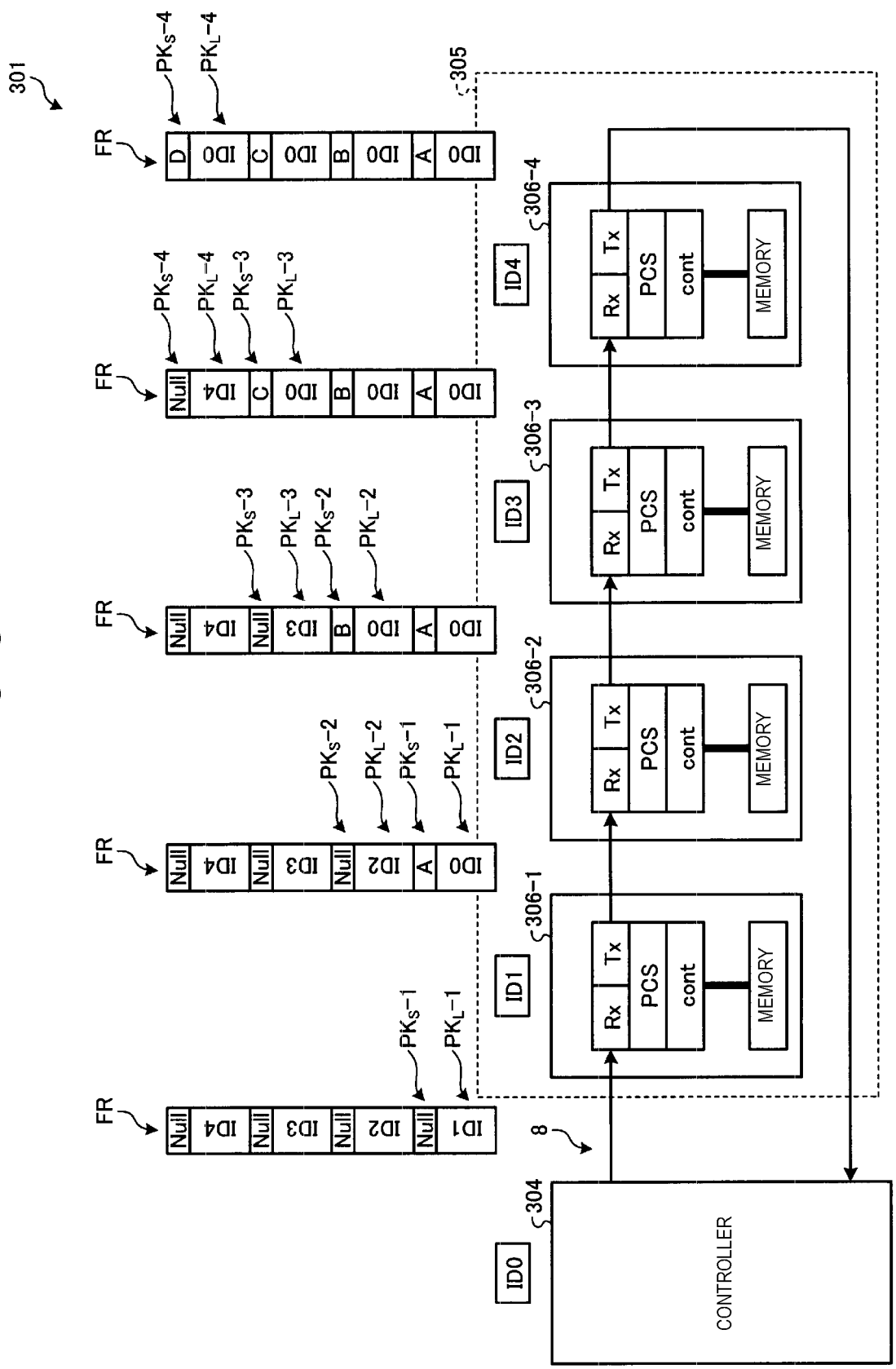
FIG. 8 is a diagram illustrating aspects related to configuration and operation of a communication system according to a fourth embodiment.

Specifically, in the communication system 301 illustrated in FIG. 8, a controller 304 and/or each device 306 (306-1 to 306-4) of a memory card 305 generates or updates a communication frame FR including both long packets and short packets as shown in FIG. 9. FIG. 8 is a diagram illustrating a configuration and an operation of the communication system 301 in the fourth embodiment. FIG. 9 is a diagram illustrating a configuration of the communication frame FR in the fourth embodiment. FIG. 9 illustrates a configuration in which the communication frame FR includes four long packets $PK_L$-1 to $PK_L$-4 and four short packets $PK_S$-1 to $PK_S$-4.

In FIG. 9, a configuration in which the long packets $PK_L$ and short packets $PK_S$ are alternately arranged in the communication frame FR is illustrated. However, the long packet $PK_L$ and the short packet $PK_S$ may be consecutively arranged in the communication frame FR instead of the being alternately arranged.

The long packets $PK_L$-1 to $PK_L$-4 have fixed data lengths $L_{PKL-1}$, $L_{PKL-2}$, $L_{PKL-3}$, and $L_{PKL-4}$, respectively. The fixed data length $L_{PKL}$ of each long packet PK satisfies the following Expression 3.

$$L_{PKL\text{-}1}=L_{PKL\text{-}2}=L_{PKL\text{-}3}=L_{PKL\text{-}4} \quad \text{Expression 3}$$

The short packets $PK_S$-1 to $PK_S$-4 have fixed data lengths $L_{PKS-1}$, $L_{PKS-2}$, $L_{PKS-3}$, and $L_{PKS-4}$ respectively. The fixed data length $L_{PKS}$ of each short packet PK satisfies the following Expression 4.

$$L_{PKS\text{-}1}=L_{PKS\text{-}2}=L_{PKS\text{-}3}=L_{PKS\text{-}4} \quad \text{Expression 4}$$

In this case, the fixed data length $L_{PKL}$ of each long packet PK and the fixed data length $L_{PKS}$ of each short packet PK may satisfy the relationship illustrated in the following Expression 5.

$$L_{PKL\text{-}1}=L_{PKL\text{-}2}=L_{PKL\text{-}3}=L_{PKL\text{-}4}>L_{PKS\text{-}1}= \\ L_{PKS\text{-}2}=L_{PKS\text{-}3}=L_{PKS\text{-}4} \quad \text{Expression 5}$$

That is, as illustrated in Expressions 3 to 5, the fixed data lengths of the packets included in the communication frame FR are mixed. With this configuration, it is possible to eliminate the process of obtaining the free capacity and the process of determining whether short information can be added, and it is possible to include the short information in the communication frame FR by a simple and efficient process.

As an example, the use case illustrated in FIG. 8 can be considered. In the communication system 301, the identification information of the controller 304, the device 306-1, the device 306-2, the device 306-3, and the device 306-4 is respectively set to ID0, ID1, ID2, ID3, and ID4. The controller 304 creates the communication frame FR in which the long packet $PK_L$ and the short packet $PK_S$ are alternately arranged four times. In this case, the controller 304 designates the identification information ID1, ID2, ID3, and ID4 as the transmission destinations in the headers H of the four long packets $PK_L$-1, $PK_L$-2, $PK_L$-3, and $PK_L$-4, respectively, and includes information to be sent to the device 206 designated by the identification information in the corresponding payload P. The controller 304 makes the header H and the payload P of the four short packets $PK_S$-1, $PK_S$-2, $PK_S$-3, and $PK_S$-4 free (Null). The controller 304 transmits the created communication frame FR to the communication path 8.

Upon receiving the communication frame FR from the controller 304 via the communication path 8, the device 306-1 recognizes that the transmission destination of the long packet $PK_L$-1 is itself (ID1) and extracts information from the long packet $PK_L$-1. When the information to be sent to the controller 304 is the short information A and long information L1, the device 306-1 adds, to the header H of the short packet $PK_S$-1, information designating the controller 304 (ID0) as the identification information of the transmission destination and ID1 as the identification information of the transmission source, and adds the short information A to the payload P of the packet. The device 306-1 rewrites the identification information of the transmission destination of the header H of the long packet $PK_L$-1 from ID1 to ID0 and the identification information of the transmission source from ID0 to ID1, and adds long information L1 to the payload P of the packet. With this configuration, the device 306-1 updates the communication frame FR. The device 306-1 transmits the updated communication frame FR to the communication path 8.

Upon receiving the communication frame FR from the device 306-1 via the communication path 8, the device 306-2 recognizes that the transmission destination of the long packet $PK_L$-2 is itself (ID2) and extracts information from the long packet $PK_L$-2. When the information to be sent to the controller 304 is the short information B and long information L2, the device 306-2 adds, to the header H of the short packet $PK_S$-2, information designating the ID0 as the identification information of the transmission destination and ID2 as the identification information of the transmission source, and adds the short information B to the payload P of the packet. The device 306-2 rewrites the identification information of the transmission destination of the header H of the long packet $PK_L$-2 from ID2 to ID0 and the identification information of the transmission source from ID0 to ID2, and adds long information L2 to the payload P of the packet. With this configuration, the device 306-2 updates the communication frame FR. The device 306-2 transmits the updated communication frame FR to the communication path 8.

Upon receiving the communication frame FR from the device 306-2 via the communication path 8, the device 306-3 recognizes that the transmission destination of the long packet $PK_L$-3 is itself (ID3) and extracts information from the long packet $PK_L$-3. When the information to be sent to the controller 304 is the short information C and long information L3, the device 306-3 adds, to the header H of the short packet $PK_S$-3, information designating the ID0 as the identification information of the transmission destination and ID3 as the identification information of the transmission source, and adds the short information C to the payload P of the packet. The device 306-3 rewrites the identification information of the transmission destination of the header H of the long packet $PK_L$-3 from ID3 to ID0 and the identification information of the transmission source from ID0 to ID3, and adds long information L3 to the payload P of the packet. With this configuration, the device 306-3 updates the communication frame FR. The device 306-3 transmits the updated communication frame FR to the communication path 8.

Upon receiving the communication frame FR from the device 306-3 via the communication path 8, the device 306-4 recognizes that the transmission destination of the long packet $PK_L$-4 is itself (ID4) and extracts information from the long packet $PK_L$-4. When the information to be sent to the controller 304 is the short information D and long information L4, the device 306-4 adds, to the header H of the short packet $PK_S$-4, information designating the ID0 as the identification information of the transmission destination and ID4 as the identification information of the transmission source, and adds the short information D to the payload P of the packet. The device 306-4 rewrites the identification information of the transmission destination of the header H of the long packet $PK_L$-4 from ID4 to ID0 and the identification information of the transmission source from ID0 to ID4, and adds long information L4 to the payload P of the packet. With this configuration, the device 306-4 updates the communication frame FR. The device 306-4 transmits the updated communication frame FR to the communication path 8.

Upon receiving the updated communication frame FR from the device 306-4 via the communication path 8, the controller 304 performs a predetermined reception process on each short packet $PK_S$-1 to $PK_S$-4 in the communication frame FR and takes out the information A to D included in the payload P of each short packet $PK_S$-1 to $PK_S$-4 and performs a predetermined process. At the same time, the controller 304 performs a predetermined reception process on each of the long packets $PK_L$-1 to $PK_L$-4, takes out the information L1 to L4 included in the payload P of each of the long packets $PK_L$-1 to $PK_L$-4, and perform a predetermined process.

As described above, in the fourth embodiment, a packet having a long data length and a packet having a short data length are both prepared, and information having a short data length is included in the short packet. This also makes it possible to reduce wasteful consumption of bandwidth and improve data transfer efficiency.

Fifth Embodiment

Next, a communication system 401 related to a fifth embodiment will be described. In the following, the description will focus on the parts that are different from the first to fourth embodiments.

In the first to fourth embodiments, since the communication path 8 serially connects the plurality of devices 6 in a ring shape (a loop), bit errors are accumulated in the course of transmitting the communication frame FR through the communication path 8. For example, in the configuration of FIG. 2, a bit error rate between the controller 4 and the device 6-1 becomes $10^{-12} \times 1$, the bit error rate between the device 6-1 and the device 6-2 becomes $10^{-12} \times 2$, the bit error rate between the device 6-2 and the device 6-3 becomes $10^{-12} \times 3$, the bit error rate between the device 6-3 and the device 6-4 becomes $10^{-12} \times 4$, and the bit error rate between the device 6-4 and the controller 4 becomes $10^{-12} \times 5$.

When the header H of each packet of the communication frame FR is corrupted due to the accumulation of this bit error, the controller 4 that receives the communication frame FR cannot know the transmission destination of the packet and cannot perform retransmission control. For that reason, there is a possibility of loss of information to be transmitted and received between the controller 4 and the plurality of devices 6.

Therefore, in the fifth embodiment, an error correction code is added to the header of each packet included in the communication frame FR so that the error correction of the header can be performed during the reception process by each device, thereby protecting the header of each packet.

The controller 4 and/or each device 6 generates a header H as illustrated in FIG. 10 when generating or updating the packet PK in the communication frame FR. FIG. 10 is a diagram illustrating a configuration of the header H in the fifth embodiment.

For example, the payload P is scrambled when the packet PK in the communication frame FR is generated. On the other hand, if data is scrambled in the header H and the header H is corrupted by 1 bit, the number of bits that are corrupted by descrambling the header H increases to a plurality of bits, and thus the header H cannot be scrambled.

The controller 4 and/or each device 6 performs an encoding process for error correction on information INF1 including the transmission destination information and the transmission source information in the header H, generates an error correction (ECC) code CD1, adds the error correction code CD1 to the information INF1, and generates a code word CW1 and includes the code word CW1 in the header H. The code word CW1 will be referred to as a forward code word CW1. In order to achieve DC balance, the controller 4 and/or each device 6 bit-inverts the code word CW1 to generate a code word CW2 for DC balance, and additionally includes the code word CW2 in the header H. The code word CW2 includes information INF2 in which the information INF1 is bit-inverted and an error correction code CD2 in which the error correction code CD1 is bit-inverted. The code word CW2 will be referred to as an inverted code word CW2.

During the reception process of the communication frame FR, each device 6 performs a decoding process for error correction on both the forward code word CW1 and the inverted code word CW2 and if succeeds in correcting either the forward code word CW1 or the inverted code word CW2 and the error bit can be corrected, the information INF1 can be properly received. When the error correction is successful, during the transmission process of the communication frame FR, each device 6 performs the encoding process for error correction on the corrected information INF1 to generate an error correction (ECC) code CD1, adds the error correction code CD1 to the information INF1 to generate a code word CW1, and includes code word CW1 in the header H as the forward code word CW1. In order to achieve DC balance, the controller 4 and/or each device 6 bit-inverts the code word CW1 to generate the code word CW2, and additionally includes the code word CW2 in the header H as the inverted code word CW2.

Figure 11:
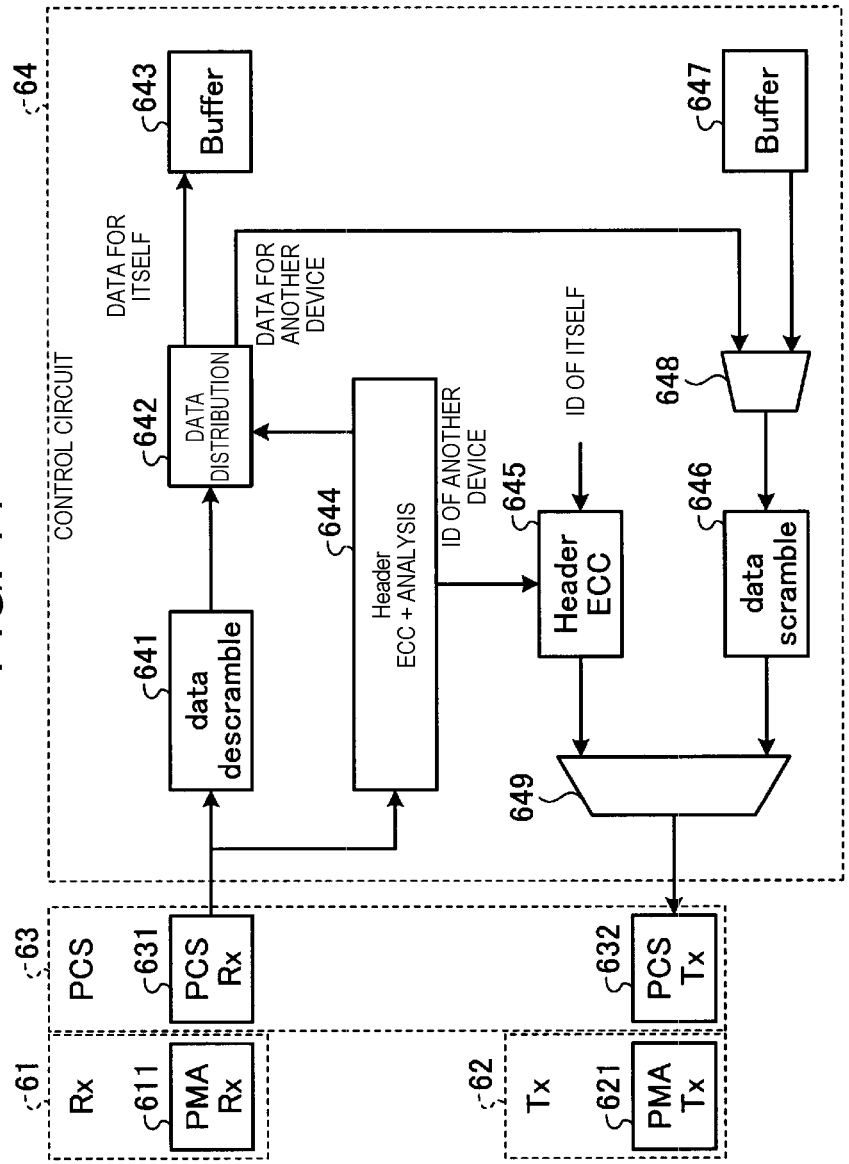
FIG. 11 is a diagram of a control circuit in each device in a fifth embodiment.

These processes can be implemented by the configuration illustrated in FIG. 11, for example. FIG. 11 is a diagram illustrating a configuration of a control circuit 64 in each device in the fifth embodiment.

In each device 6, when the Rx 61 receives a signal corresponding to a communication frame via the communication path 8, the Rx 61 converts the received signal into a communication frame of the physical layer by a "PMA Rx" circuit 611, and supplies the converted communication frame to the PCS 63. The PCS 63 performs protocol conversion of the communication frame of the physical layer to the communication frame of the upper layer by a "PCS Rx" circuit 631 and supplies the converted communication frame to a "data descramble" circuit 641 and a "Header ECC+analysis" circuit 644 of the control circuit 64.

The "data descramble" circuit 641 descrambles the payload P of each packet PK and supplies the descrambling result to a "data distribution" circuit 642. The "Header ECC+analysis" circuit 644 performs the decoding process for error correction on both the forward code word CW1 and the inverted code word CW2 included in the header H of each packet PK. If the error correction is successful, the "Header ECC+analysis" circuit 644 supplies a packet including the ID of itself to a "data distribution" circuit 642 and supplies a packet including the IDs of other devices to a "Header ECC" circuit 645. A packet including the IDs of other devices is subjected to the encoding process for error correction in the "Header ECC" circuit 645, and a header H including the forward code word CW1 and the inverted code word CW2 is generated, and the generated header H is supplied to a selector 649.

If the transmission destination of the packet PK is itself, the "data distribution" circuit 642 stores data extracted from the payload P in a buffer 643 and supplies data of the free payload P for another device to the selector 648. If information to be transmitted is stored in a buffer 647, the selector 648 supplies the information as the payload P to the "data scramble" circuit 646, and if the buffer 647 is available, the selector 648 supplies the free payload P supplied from the "data distribution" circuit 642 to the "data scramble" circuit 646. The "data scramble" circuit 646 scrambles the payload P and supplies the scrambled result to the selector 649. The selector 649 sequentially selects the header H from the "Header ECC" circuit 645 and the payload P from the "data scramble" circuit 646 and supplies the header H and the payload P to the "PSC Tx" circuit 632 of the PCS 63.

The "PSC Tx" circuit 632 performs protocol conversion of a communication frame including a plurality of packets PK including the header H and the payload P from a communication frame of the upper layer to a communication frame of the physical layer and supplies the communication frame to the Tx 62. The Tx 62 converts the supplied physical layer communication frame to a signal for transmission by the "PMA Tx" circuit 62 and transmits the signal to the communication path 8.

As described above, in the fifth embodiment, an error correction code is added to the header of each packet included in the communication frame FR so that the error correction of the header can be performed during the reception process by each device. With this configuration, it is possible to protect the header of each packet and prevent the loss of information to be transmitted and received between the controller 4 and the plurality of devices 6.

While certain embodiments have been described, these embodiments have been presented by way of example only, and do not limit the scope of the disclosures. Indeed, the novel embodiments described herein may be embodied in a variety of other forms; furthermore, various omissions, substitutions and changes in the form of the embodiments described herein may be made without departing from the spirit of the disclosures. The accompanying claims and their equivalents cover such forms or modifications as would fall within the scope and spirit of the disclosures.

What is claimed is:

1. A communication system, comprising:
a controller;
a plurality of devices serially connected to the controller, each device having a different identifying information from each other device; and
a communication path connecting the controller to the plurality of devices in a loop, the communication path configured to transmit a communication frame as a differential serial signal, the communication frame being serially transmitted to the plurality of devices via the communication path, wherein
the communication frame includes a plurality of packets, each packet in the plurality of packets having a fixed data length and capable of including identifying target information that is different from the identifying information of other target devices included in the other packets in the plurality of packets, the identifying information of the target device corresponding to one of the identifying information of the plurality of devices, and
each device is configured to insert data into, and extract data from, a packet in the communication frame.

2. The communication system according to claim 1, wherein each device is configured to insert data into, and extract data from, a first packet in the communication frame when a header included in the first packet includes the identifying information of the target device corresponding to the identifying information of the device which is a transmission destination.

3. The communication system according to claim 1, wherein,
each device is configured to insert data into a first packet in the communication frame when the first packet is a null packet and configured to change a header of the first packet to reflect the insertion of data into the first packet.

4. The communication system according to claim 1, wherein each device is configured to:
insert data into a first packet in the communication frame when the first packet is both a null packet and a header of the first packet includes the identifying target information corresponding to the identifying information of the device which is a transmission destination, and
change the header of the first packet to reflect the insertion of data in to the first packet.

5. The communication system according to claim 1, wherein each device is configured to insert data of less than the fixed data length into a first packet in the communication frame when the first packet is a null packet and a header of the first packet includes remaining capacity information indicating a free capacity of a payload of the first packet, and a size of the data to be included in the first packet by the device is less than or equal to the indicated free capacity.

6. The communication system according to claim 5, wherein each device is further configured to add another header to the first packet updating the remaining capacity information.

7. The communication system according to claim 1, wherein each device is configured to insert a data group into a first packet in the communication frame, the data group including a header and a payload of a combined size of less than the fixed data length of the first packet.

8. The communication system according to claim 1, wherein the plurality of packets includes:
a first packet having a first fixed data length, and
a second packet having a second fixed data length shorter than the first fixed data length.

9. The communication system according to claim 1, wherein each packet includes a header and a payload, and the header includes a first code word of information and an error correction code of the information.

10. The communication system according to claim 9, wherein the header further includes a second code word obtained by inverting bit values of the first code word.

11. The communication system according to claim 1, wherein the devices are memory devices and the controller is a memory controller.

12. The communication system according to claim 11, wherein the memory devices are each memory chips mounted on a common memory card.

13. A memory device, comprising:
a communication interface circuitry configured to connect a communication path serially connecting a controller to a plurality of memory devices in a loop and transmit a communication frame as a differential serial signal on the communication path, the communication frame being serially transmitted to the plurality of memory device via the communication path, wherein
each memory device in the plurality of memory devices having different identifying information from each other memory device, each communication frame includes a plurality of packets, each packet in the plurality of packets having a fixed data length and capable of including identifying target information that is different from the identifying information of other target devices included in the other packets in the plurality of packets, the identifying information of the target device corresponding to the identifying information of one of the plurality of memory devices, and
the communication interface circuitry is configured to insert data into, and extract data from, a packet in the communication frame.

14. The memory device according to claim 13, wherein the communication interface is configured to insert data into, and extract data from, a first packet in the communication frame when a header included in the first packet includes the identifying information of the target device corresponding to the identifying information of the memory device which is a transmission destination.

15. The memory device according to claim 13, wherein the communication interface is configured to insert data into a first packet in the communication frame when the first packet is a null packet and configured to change a header of the first packet to reflect the insertion of data into the first packet.

16. The memory device according to claim 13, wherein the communication interface is configured to:
insert data into a first packet in the communication frame when the first packet is both a null packet and a header of the first packet includes the identifying information of the target device corresponding to the identifying information of the memory device which is a transmission destination, and
change the header of the first packet to reflect the insertion of data in to the first packet.

17. The memory device according to claim 13, wherein the communication interface is configured to insert a data group into a first packet in the communication frame, the data group including a header and a payload of a combined size of less than the fixed data length of the first packet.

18. The memory device according to claim 13, wherein each packet includes a header and a payload, and
the header includes a first code word of information and an error correction code of the information.

19. A communication method, comprising:
transmitting a communication frame as a differential serial signal from a controller on a communication path serially connecting the controller to a plurality of devices in a loop, the plurality of devices each having different identifying information, the communication frame being serially transmitted to the plurality of devices via the communication path, the communication frame including a plurality of packets, each packet in the plurality of packets having a fixed data length and capable of including identifying information of a target device that is different from the identifying information of other target devices in the other packets in the plurality of packets, the identifying information of the target device corresponding to the identifying information of one of the plurality of devices; and
having a device of the plurality of devices insert data into, or extract data from, a packet in the communication frame received from the controller.

20. The communication method according to claim 19, wherein each of the packets in the plurality of packets has a different fixed data length from the other packets in the plurality of packets.

* * * * *